UNITED STATES PATENT OFFICE.

CHARLES B. ROCKWOOD, OF INDIANAPOLIS, INDIANA.

COMPOSITION OF MATTER FOR COVERING WALLS, &c.

SPECIFICATION forming part of Letters Patent No. 542,172, dated July 2, 1895.

Application filed March 2, 1895. Serial No. 540,384. (No specimens.)

*To all whom it may concern:*

Be it known that I, CHARLES B. ROCKWOOD, a citizen of the United States, residing at Indianapolis, in Marion county, and State of Indiana, have invented certain new and useful Improvements in the Composition of Matter for the Covering of Walls and other Surfaces; and I do declare the following to be a full, clear, and exact description of the invention, such as will enable others skilled in the art to which it appertains to make and use the same.

My composition consists of the following ingredients, combined in substantially the proportions as follows, viz: sugar, ten to fifty pounds; alum, five to one hundred pounds; lime, one hundred to five hundred pounds; dry white lead, fifty to three hundred pounds; clay, one hundred to one thousand pounds; linseed-meal, ground, fifty to three hundred pounds, for which last may be substituted an equal quantity of cotton-seed meal, ground. I bring together and mix and mingle these ingredients in a thorough manner, and to prepare the plaster for walls and other surfaces I use from ten to fifty pounds of the mixture so obtained, with from eight hundred to one thousand pounds of clean sharp sand and from two hundred to five hundred pounds of calcined gypsum, all thoroughly mixed and mingled together dry. I then add water in quantity sufficient upon further mixing to produce the required consistency and apply to the surface.

The product secured by mixing the sugar, alum, lime, white lead, clay, and linseed or cotton-seed meal, when affected by water regulates the time of setting of the calcined gypsum within the power of the operator to control, causes the mortar to spread easily, and confers upon it increased adhesiveness, hardness, tenacity, plasticity, and fire and water proofing qualities. It also prevents the mortar from cracking on hardening, renders it capable of being wrought to a surface of superior smoothness and of being applied with safety to iron, wood, stone, brick, or tile, as well as being cast into molded forms.

I am aware that sugar, lime, sand, water, and clay have been used in the composition of certain lime-mortars; that lime, sand, water, and calcined gypsum have been used to produce a finish-coat applied to lime-mortar surfaces; that alum, calcined gypsum, and water are used to manufacture a cement; but I am not aware that sugar, alum, lime, dry white lead, clay, and linseed or cotton-seed meal have been employed with calcined gypsum, sand, and water to produce a mortar.

What I claim, and desire to secure by Letters Patent of the United States, is—

The herein described composition of matter to be used for covering walls and other surfaces, consisting of dry white-lead, sugar, alum, lime, linseed-meal, or cotton-seed meal, clay, calcined gypsum, sand and water in proportion and union substantially as specified.

In testimony whereof I affix my signature in the presence of two witnesses.

CHARLES B. ROCKWOOD.

Witnesses:
H. H. McGAFFEY,
GEO. A. PEGG.